(12) United States Patent
Pabst et al.

(10) Patent No.: US 9,360,049 B2
(45) Date of Patent: Jun. 7, 2016

(54) BEARING POSITION WITH A SINGLE ROW POLYGONAL BEARING

(71) Applicant: Schaeffler Technologies GmbH & Co. KG, Herzogenaurach (DE)

(72) Inventors: Alexander Pabst, Eckental (DE); Frank Schoenstein, Charlotte, NC (US); Rainer Welker, Herzogenaurach (DE); Jochen Ott, Roettenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/338,878

(22) Filed: Jul. 23, 2014

(65) Prior Publication Data

US 2015/0043860 A1 Feb. 12, 2015

(30) Foreign Application Priority Data

Aug. 12, 2013 (DE) .......................... 10 2013 215 890

(51) Int. Cl.
| | |
|---|---|
| *F16C 27/04* | (2006.01) |
| *F16C 33/58* | (2006.01) |
| *F16C 35/067* | (2006.01) |
| *F16C 19/46* | (2006.01) |
| *F16C 25/08* | (2006.01) |

(52) U.S. Cl.
CPC ............... *F16C 33/583* (2013.01); *F16C 19/46* (2013.01); *F16C 25/08* (2013.01); *F16C 33/588* (2013.01); *F16C 35/067* (2013.01)

(58) Field of Classification Search
CPC ...... F16C 27/04; F16C 33/581; F16C 33/583; F16C 33/585

USPC ............. 384/564, 569, 581, 584; 29/724, 725
See application file for complete search history.

(56) References Cited

U.S. PATENT DOCUMENTS

| | | | | |
|---|---|---|---|---|
| 3,307,891 | A * | 3/1967 | Carullo | F16C 27/04 384/569 |
| 4,976,551 | A * | 12/1990 | Scharting | B65D 59/00 29/724 |
| 5,567,060 | A * | 10/1996 | Steinberger | F16C 19/466 384/569 |
| 2013/0087412 | A1 * | 4/2013 | Carter | F16C 33/6677 184/6.11 |

FOREIGN PATENT DOCUMENTS

| | | |
|---|---|---|
| DE | 4134369 A1 | 4/1992 |
| DE | 102012222279 A1 | 10/2013 |
| FR | 2789458 A1 | 8/2000 |

* cited by examiner

*Primary Examiner* — Phillip A Johnson
(74) *Attorney, Agent, or Firm* — Simpson & Simpson, PLLC

(57) ABSTRACT

A bearing position for rotatably mounting a shaft or an axle in a housing. The bearing position comprises a rolling bearing, which is designed as a roller bearing, with a bearing ring, which is assigned to the housing, where said bearing ring forms an outer rolling raceway, which faces radially inwards and on which rolling elements are guided, said rolling elements mutually interacting with a shaft, which forms an inner rolling raceway, or with an inner bearing ring. A polygonal bearing is provided as the roller bearing; and said polygonal bearing encloses a bearing ring with at least one elastic section, which forms a transversely convex raceway curvature. This arrangement guarantees that at least one rolling element is supported and guided in a radially prestressed manner without radial clearance on the rolling raceway.

11 Claims, 3 Drawing Sheets

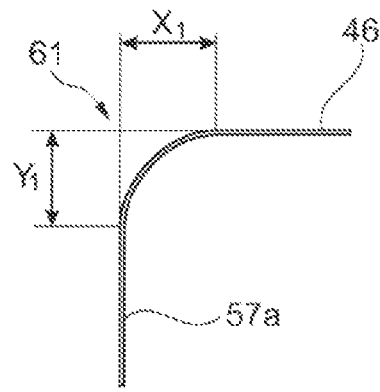
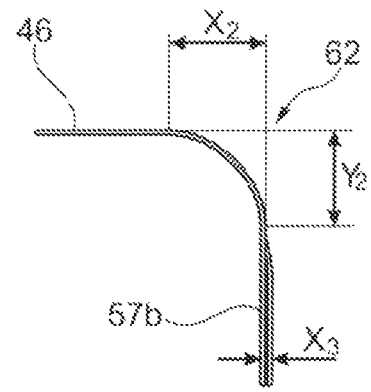
Fig. 6  Fig. 7
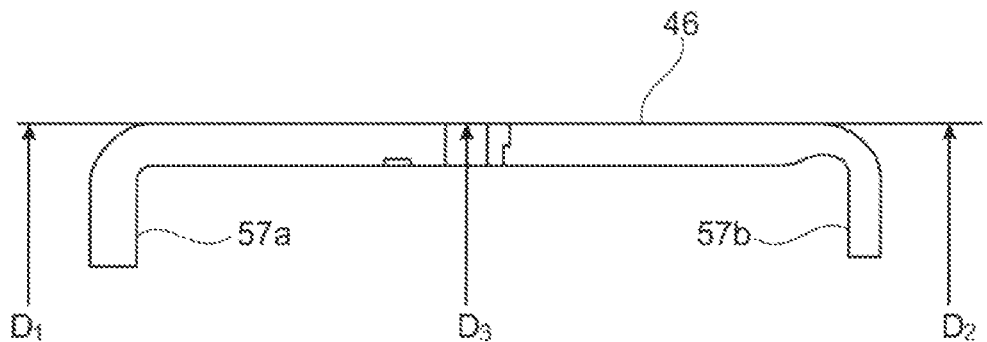
Fig. 8
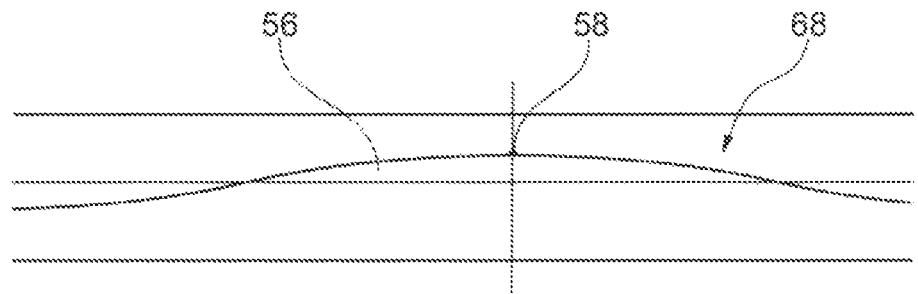
Fig. 9

BEARING POSITION WITH A SINGLE ROW POLYGONAL BEARING

CROSS-REFERENCE TO RELATED APPLICATIONS

This patent application is filed under 35 U.S.C. §119(a) and claims priority to German Patent Application No. DE102013215890.4, filed Aug. 12, 2013, which application is hereby incorporated by reference in its entirety.

FIELD OF THE INVENTION

The invention relates to a bearing position for rotatably mounting a shaft or an axle in a housing, and to a method for manufacturing a roller bearing intended for the bearing position.

BACKGROUND OF THE INVENTION

Roller bearings are rolling bearings with rollers as the rolling elements. These rolling bearings have an inner and an outer rolling raceway, between which the rolling elements are arranged in succession about an axis of rotation axis in the circumferential direction. The rolling raceways are formed by choice either on the bearing rings or on the surface of the stationary component and on the surface of the component to be supported. As the rolling elements it is possible to use cylindrical rollers or needles for the roller bearing, where said cylindrical rollers or needles can also be made with a slightly convex shell, deviating from an outer cylindrical shape. The end faces are preferably flat; as an alternative, they are curved convexly or concavely. Needles are roller-like rolling elements at a ratio of their length to the nominal diameter of the shell that is equivalent to ≥ the numerical value of 2. Preferably the rolling elements are used in a cage that guides the rolling elements in the circumferential direction.

Owing to the manufacturing tolerances and for reasons relating to ease of assembly, radial bearings typically exhibit a radial clearance. In this case the bearing clearances occur in a ring gap between the rolling elements or more specifically between the rollers and their associated rolling raceways. The radial distance between the opposing rolling raceways is the sum of the diameter of the rollers and the radial clearance. Within this clearance the rollers can move radially between the rolling raceways, a feature that can result in a disadvantageous generation of noise. Furthermore, it is possible for bearing positions of rolling bearings with radial bearings to become disadvantageous, for example, when mounting the converter neck of the torque converter by means of an axial offset of the converter neck in relation to the associated component. The net result of this arrangement is a radial runout and, associated with said radial runout, an uneven load on the bearing position or more specifically the roller bearings, a situation that in turn is associated with a disadvantageous generation of noise.

DE 41 34 369 A1 shows a motor vehicle transmission with a hydrodynamic torque converter, wherein an input shaft to the transmission is connected in a rotationally rigid manner to the turbine impeller of the torque converter. A cylindrical extension of the pump impeller of the torque converter forms the converter neck. The pump impeller can be connected, if required, to a primary pump, by means of which the transmission is supplied with hydraulic fluid and the torque converter is supplied with oil. The pump impeller is rotatably mounted by means of the converter neck at a bearing position in a housing by way of a rolling bearing that is designed as a roller bearing. Owing to the axial offset or the tilting of the axes of rotation in the arrangement the bearing positions or more specifically the roller bearings are loaded disadvantageously, in particular unevenly, a situation that is associated with a disadvantageous generation of noise.

FR 27 89 458 A1 discloses a rolling bearing that is designed as a roller bearing for the purpose of mounting a steering column. As a measure to compensate for the bearing clearance in the installed state, the roller bearing comprises an outer bearing ring, which is circumferentially defined by end sections on both sides. These sections are connected locally by means of tabs to a central circumferential section. The section that forms a raceway for the rolling elements on the internal face is guided on the opposite side on the shaft or rather the steering column. Furthermore, the central circumferential section has a curved rolling element raceway, which tapers off in the area of the tabs, in order to have an impact on the bearing clearance, so that the rolling elements are prestressed in an elastic manner in the installed state of the roller bearing.

The object of the present invention is to provide a noise-optimized roller bearing with a reduced bearing clearance.

BRIEF SUMMARY OF THE INVENTION

The solution to this problem is solved by means of a bearing position in accordance with the features disclosed in the claims and by means of the claimed method.

The bearing position comprises a roller bearing or more specifically a rolling bearing that is constructed as a polygonal bearing, wherein said rolling bearing or roller bearing comprises a bearing ring with raceway curvatures that exhibit a transverse convexity, form elastic sections, and are arranged in a polygonal shape. The net result of the elastically designed sections that interact with the rolling elements is a geometry that deviates from the cylindrical shape. The section is prestressed in an elastic manner by means of the raceway curvature in the radial direction against at least one roller or needle of the roller bearing, preferably, however, against two, three or more rolling elements that are designed as rollers. Due to the fact that the section of the sleeve is prestressed radially against the roller(s), these rollers are supported in the radially inwards direction of the axis of rotation on the outer rolling raceway of an inner bearing ring or on a shaft. The raceway curvatures, which are configured preferably on the outer bearing ring in the direction of the axis of rotation of the bearing position, improve in an advantageous way the elasticity of a rolling raceway and have the advantageous impact of a clearance-free mounting.

The outer rolling raceway for the rollers or more specifically the rolling elements can be formed directly on the surface section of a shaft or on an inner bearing ring. The inner rolling raceway forms the outer bearing ring that is fitted into a housing. Since the raceway curvatures of the polygonal bearing are arranged, according to the invention, in the shape of a polygon, the result is a desired high elasticity in the load bearing areas, which may also be called the valleys. In the non-load bearing areas, the hills of the raceways, the result is a relatively high rigidity of the bearing ring or the bearing sleeve. Hence, this arrangement yields a lower or higher compression or stiffness as a function of the circumferential or angular position of the rotating load.

The polygonal bearing of the bearing position makes it possible to compensate for a defined production-induced axial offset and/or radial runout in the area of the bearing position owing to the elastic sections that exhibit a transverse convexity. The radial prestress, which is induced by the convexly shaped elastic sections on the rolling elements that are designed as rollers or needles, has the desired effect of eliminating the radial clearance, which in turn has the advantageous effect of preventing noise. In the case of a shaft that rotates in relation to the housing, the rolling elements of the roller bearing roll on the rolling raceways. In so doing, the rolling elements pass the protruding sections that form the bottlenecks, eliminate the bearing clearance, exhibit an elastic transversely convex shape and are defined with respect to the rest of the raceway of the rolling elements. The use of the inventive bearing position in a transmission makes it possible in an advantageous way to compensate for an uneven load on the bearing position or more specifically on the rolling bearing. Such disadvantageous loads occur, in particular, during an axial offset or radial runout, so that the result is a departure from the axially parallel ideal position of the axes of rotation or the axes of symmetry of the components that interact with each other.

One advantageous embodiment of the invention provides that at least one bearing ring of the polygonal bearing of the bearing position comprises, in addition to raceway curvatures, which form elastic sections and which exhibit a transverse convexity, additional radially elastic sections, which form a longitudinal convexity and are oriented in the circumferential direction. With this measure the elasticity of the bearing ring and consequently the elasticity of the roller bearing can be increased even more. Owing to the transversely convex and/or longitudinally convex raceway curvatures of the elastic sections, which compress in the desired elastic manner under a radial load, it is possible to realize a clearance-free, noise-optimized polygonal bearing. Furthermore, it is advantageous that the elasticity and consequently the compression can be adapted in the manner of a polygon to the radial load by means of a suitable structural design or more specifically the shape of the elastic sections that are designed with a transverse convexity or longitudinal convexity. Preferably the polygonal bearing forms a polygonal shape designed in the shape of a triangle, so that each of its elastic sections, which exhibit a transverse convexity and/or a longitudinal convexity, is inserted into at least one bearing ring at an angular offset of 120° from each other in each case. This arrangement also leads to an angular distance of 120° between the load bearing areas and the non-load bearing areas.

In order to increase a contact surface relative to the rolling elements, the elastic section exhibiting a transverse convexity comprises preferably a central flattened zone in the area of a peak or rather the turning point of the raceway curvature. As a measure to optimize the elasticity, it is advisable to provide for the sections of the bearing ring that enclose a raceway curvature a wall thickness that is less than that of the other sections of the bearing ring. Furthermore, the invention comprises preferably a ratio of ≥10 between the diameter of the inner rolling raceway and the radial wall thickness of the sleeve. A material that is especially appropriate for the sleeve designed according to the invention is sheet steel.

Furthermore, the outer bearing ring comprises a solid edge and on the opposite side a flanged edge, by means of which a rolling element cage can be guided in the axial direction. Furthermore, the outer contour of the outer bearing ring exhibits a conicity, where an outer diameter $D_2$, assigned to the flanged edge, surpasses an outer diameter $D_1$ at the solid edge. At the same time an enveloping circle, a maximum circumscribed circle, is generated in the region of the outer diameters $D_1$ and $D_2$ of the bearing ring. Between the enveloping circles the sleeve defines the largest possible inscribed circle, the maximum inscribed circle, defined with $D_3$. Furthermore, the diameter $D_3$ is in the following relationship to the outer diameters $D_1$ and $D_2$: $(D_1+D_2)/2-D_3 \geq 0.5$ mm.

Preferably the solid edge and/or the flanged edge of the outer bearing ring comprise and/or comprises radially on the interior face a profiling in the form of a crown. For example, it is possible for the polygonal bearing to achieve a higher rate of flow of the lubricating oil, thus improving the lubrication and cooling, by means of the, for example, semi-round profiling that is designed as an open perforation or recess. Furthermore, the profiling can be used for position orientation or recognition of a faulty assembly. In addition, the crown shape offers for an automated assembly the advantage that the sleeve or more specifically the bearing ring can be received and mounted reliably in a non-positive manner by means of a tool.

According to an additional embodiment, chamfer dimensions or the roundness of the edges that may deviate from each other and that are generated during production, during the forming or the flanging process, are provided on the outer bearing ring. An axial and radial chamfer dimension of 1.2±0.5 mm is provided in a transition zone between the outer diameter and the solid edge. The axial and radial chamfer dimension in the transition zone between the outer diameter and the flanged edge amounts to 1.5±0.5 mm.

An additional advantageous concept of the outer bearing ring of the polygonal bearing according to the invention provides a deviation from roundness of ≥0.2 mm, preferably a measurement range between 0.2 and 0.35 mm in the loose state. Placed in a ring gauge made of steel, an amount of ≥0.025 mm is provided for the deviation from roundness of the bearing ring, where the limiting amount is 0.045 mm. In addition, a linearity in the axial direction, an amount of the plane of symmetry of ±1 mm, is provided for the raceway curvature.

Furthermore, defined measurement ranges for the raceway linearity in the axial direction are provided for a preferred concept of the raceway curvature of the polygonal bearing according to the invention. In the loose state of the bearing ring an amount of ≥0.015 mm is provided for the linearity of the raceway, where the limiting amount is 0.04 mm. In the pressed-in state of the polygonal bearing the non-load bearing area (A), a hill zone, shows a value of ≥0.01 mm, which amounts to no more than 0.02 mm; and the load bearing area (B), a valley zone, shows a value of ≥0.02 mm, which amounts to no more than 0.04 mm.

A roller bearing, which is designed according to the invention, can be used preferably for a transmission with a torque converter, in that, for example, a pump impeller of the torque converter that is connected to a converter neck is mounted in a rotatable manner in a housing by means of the bearing position comprising a polygonal bearing. For an ideal alignment, for example between the axis of rotation from the converter neck to the axis of symmetry of the housing bore, any axial offset that may result from this arrangement can be largely compensated by means of the measure according to the invention. Furthermore, this arrangement has the advantageous effect of avoiding a disadvantageous tumbling of the rotating components, a feature that has a positive impact on the wear characteristics and the generation of noise. In addition to additional possible applications, the bearing position according to the invention can be used advantageously as a mounting for a steering assembly for a vehicle. The clearance compensation, which can be actively achieved by means of the invention, decisively improves the steering comfort of the vehicle.

The invention also comprises a method for manufacturing the roller bearing for a bearing position comprising the following steps. First, the bearing ring, which is designed preferably as a sleeve and which has a solid edge, is manufactured by forming a sheet metal strip, in particular, by means of a drawing process. At the same time a profiling is affixed on the inner face of at least one edge. The next step is to flange the flanged edge. The insertion of the bearing ring into a die comprising the polygonal shape is provided as the next step. The tool, the die, is designed in such a way that after the forming process the bearing ring exhibits both a defined deviation from roundness and a convex raceway curvature in the polygon-shaped sections. This step is followed by a heat treatment of the bearing ring that is designed as a sleeve, wherein the heat treatment improves the resistance to wear. Then the roller bearing is completed in that components, such as a cage with a slit and the rolling elements, which are designed as rollers or needles, are inserted into the sleeve, in order to complete the polygonal bearing. In order to form the bearing position, the roller bearing, which is designed as a polygonal bearing, is pressed, for example, into a receiving bore of a housing.

BRIEF DESCRIPTION OF THE DRAWINGS

Additional features of the invention will be apparent from the following description of the figures, which show exemplary embodiment of the invention. In this case the invention is not limited to these exemplary embodiments. The drawings are as follows:

FIG. 6 is an enlarged view of a chamfer dimension of the outer bearing ring in the region of the solid edge;

FIG. 7 is an enlarged view of a chamfer dimension of the outer bearing ring in the region of the flanged edge;

FIG. 8 illustrates an outer contour of the sleeve, in order to elucidate an outer conicity; and, FIG. 9 is a record of a data recorder for measuring the linearity of the convex raceway curvature of the bearing ring.

DETAILED DESCRIPTION OF THE INVENTION

Figure 1:
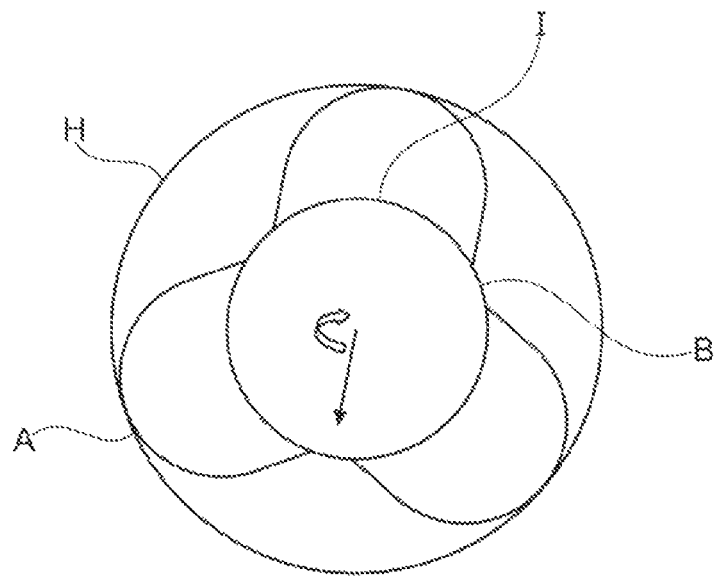
FIG. 1 illustrates in schematic form the underlying principle of a polygonal bearing.
Figure 2:
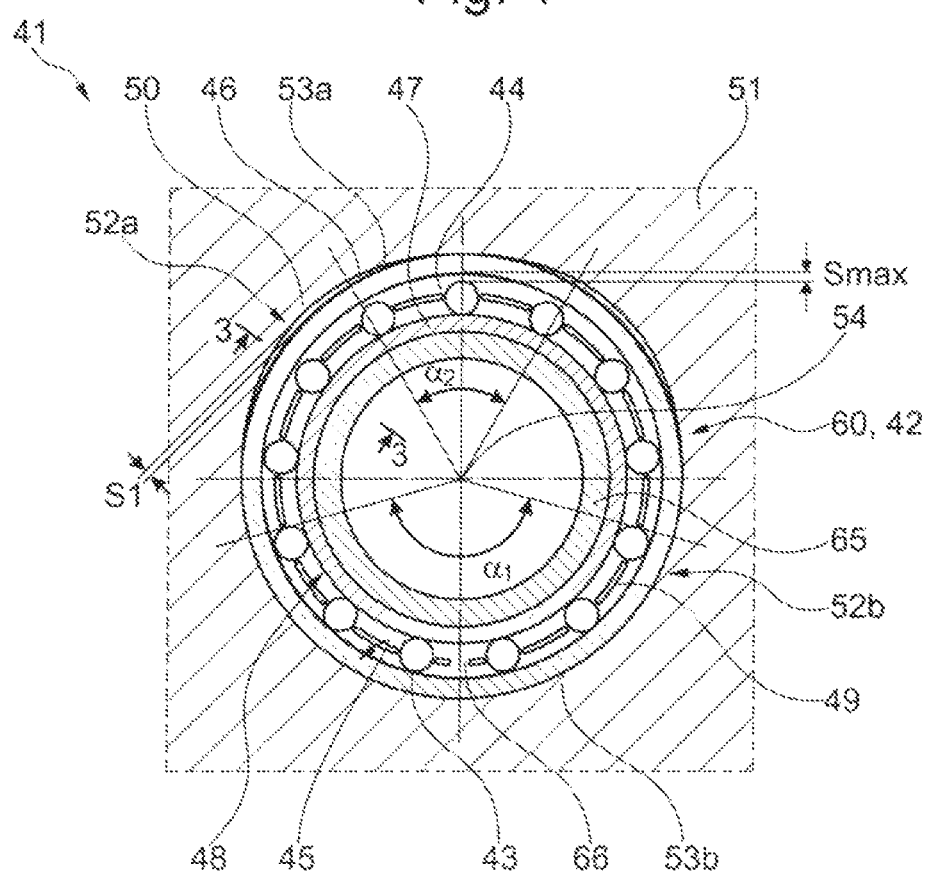
FIG. 2 is a cross sectional view of a roller bearing of a bearing position according to the invention, the roller bearing being designed as a polygonal bearing.

FIG. 1 shows the features of a roller bearing 42 according to FIG. 2, where the roller bearing is designed as a polygonal bearing and has the shape of a polygon that is constructed in the form of a triangle. The polygonal shape forms three non-load bearing areas, which are marked with the letter A. These non-load bearing areas, which are offset from each other at an angle of 120°, may also be referred to as the hill zones. Furthermore, there are three load bearing areas or rather three valley zones, which are marked with the letter B. The polygonal shape is enclosed by an enveloping circle H. An inner circle I corresponds to the largest possible internal circle of the polygonal shape, which may also be referred to as the maximum inscribed circle. The internal arrow marks the circumferential radial load on the polygonal bearing that causes an uneven suspension at the periphery owing to the hard and soft areas or zones of the polygonal bearing.

FIG. 2 is a sectional view of a bearing position 41 according to the invention. This bearing position comprises a roller bearing 42 that is designed as a polygonal bearing 60. As apparent from this drawing, the rolling elements 43, which are designed as rollers, are adjacent to each other on the periphery in a ring gap 44; and they are arranged radially between an inner rolling raceway 45 of an outer bearing ring 46 and an outer rolling raceway 48 on an inner bearing ring 47, which is guided on a central shaft 65. In this case the rolling elements 43 are guided as uniformly as possible on the periphery in a cage 49 having a slit 66. The roller bearing 42 is inserted into a bore 50 of a housing 51 by way of the bearing ring 46 in a non-positive manner, for example, by means of a press fit. The bearing position 41 has two radially elastic sections 52a, 52b, which extend in the circumferential direction and are offset from each other at an angle and form a longitudinal convexity. These radially elastic sections, which extend from an axis of rotation 54, are convexly curved and form a polygonal shape for the inner rolling raceway 45. The elastic sections 52a, 52b constrict the ring gap 44, as a result of which the rolling elements 43 are radially prestressed at least in these areas at the inner rolling raceway 45 and are supported with zero clearance. On the other hand, there is a radial clearance $S_1$ between a cylindrical outer contour of the bearing ring 46 and the bore 50 of the housing 51 in the area of the sections 52a, 52b. The inner rolling raceway 45 has not only the elastic sections 52a, 52b, but also two adjacent areas 53a, 53b, by means of which the bearing ring 46 is fitted into the bore 50 of the housing 51. The areas 53a, 53b are defined by a common radius extending from an axis of rotation 54. In this respect the length of the radius corresponds to the radiant of the arc of a circle that is described by the angle $a_1$ or $a_2$. In the area 53a, a zone of the roller bearing 42 with a small radial load, a maximum radial clearance $S_{max}$ occurs between the inner rolling raceway 45 and the rolling elements 43.

Figure 3:
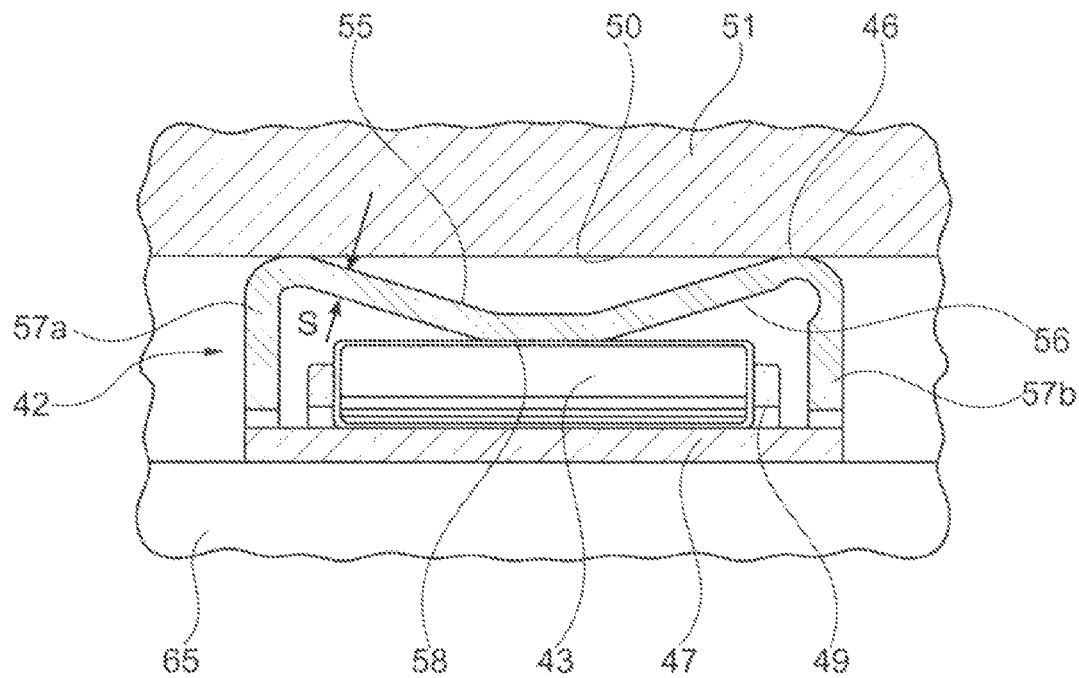
FIG. 3 is a detailed section 3-3 of the roller bearing according to FIG. 2.

FIG. 3 shows an exploded detailed section 3-3 of the roller bearing 42 according to FIG. 2 in a radially prestressed state of installation. In addition, the bearing ring 46, which is designed as a sleeve, comprises an elastic section 55, which is oriented in the longitudinal direction of the shaft 65 and forms a raceway curvature 56 having a transverse convexity. The section 55 is incorporated preferably with the section 52a into an identical zone of the bearing ring 46. The raceway curvature 56 of the section 55 of the bearing ring 46 causes the radial force to be transmitted to the rolling element 43 that is formed as the roller and that is mutually supported in a non-positive manner on the inner bearing ring 47. The effect of the raceway curvature 56, which is incorporated jointly in the polygon-like contour of the bearing ring 46 and which extends from the lateral edges 57a, 57b, is an improved elasticity of the roller bearing 42. As a measure for enlarging a contact surface relative to the rolling elements 43, the elastic section 55 having a transverse convexity comprises preferably a central flattened contact zone 58 in the region of a peak or rather a turning point of the raceway curvature 56, as a result of which the pressure per unit of area is simultaneously decreased. Furthermore, the elasticity can be influenced by a variation or more specifically by varying wall thicknesses S of the bearing ring 46 in the area of the raceway curvature 56.

Figures 4, 5:
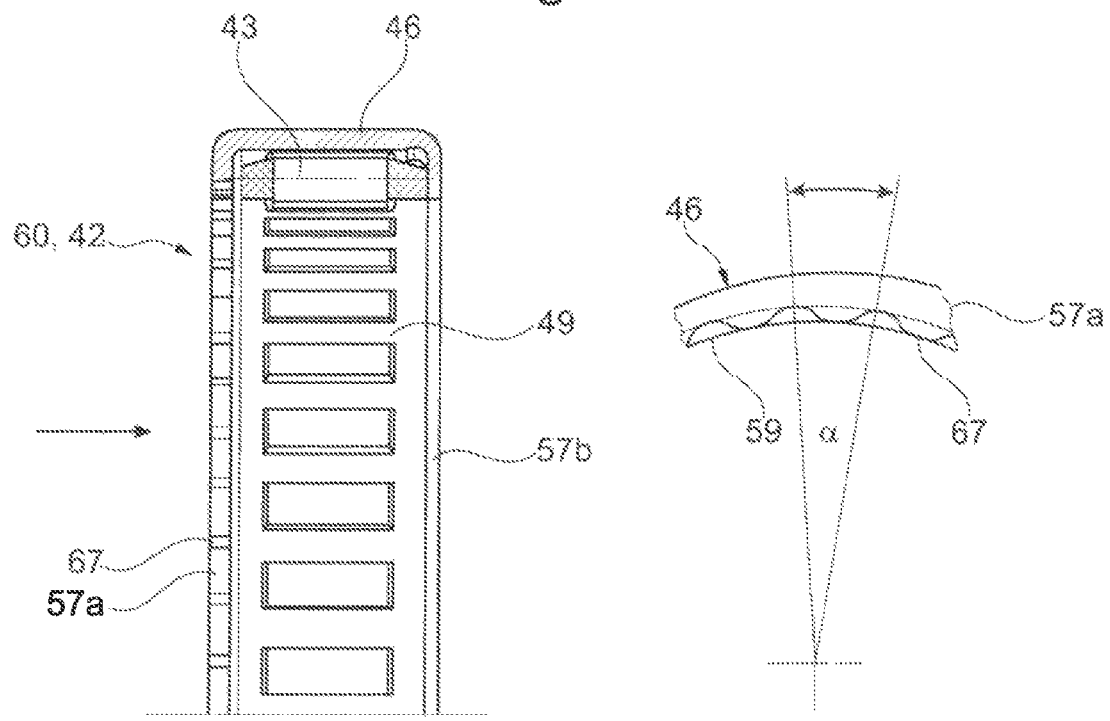
FIG. 4 is a sectional view of a single row polygonal bearing as a roller bearing.
FIG. 5 is a side view of a detail of the polygonal bearing according to FIG. 4.

FIG. 4 is a cross sectional view of parts of the roller bearing 42 without an inner bearing ring 47. The roller bearing 42 consists of the bearing ring 46, which encloses the cage 49 and, inserted into said cage, the rollers or more specifically the rolling elements 43. For the axial guide of the cage 49, the bearing ring 46 comprises laterally two edges 57a, 57b that are opposite each other and that point radially inwards. In this case the edge 57a is designed as a solid edge; and the edge 57b is designed as a flanged edge.

FIG. 5 is a detailed view of the roller bearing 42 according to the direction of the arrow from FIG. 4 and elucidates an internal profiling 67 of the edge 57a of the outer bearing ring 46. The profiling 67, which may also be referred to as the crown shape, comprises preferably symmetrically distributed, semi-circular punched blanks 59, which are spaced apart from each other at an angle a over the entire inner circumference of the edge 57a. The profiling 67 simplifies, for example, a positive locking accommodation of the roller bearing 42 during an automatic assembly. Furthermore, the roller bearing 42 can be marked individually by means of the profiling 67, in order to avoid a faulty assembly.

FIG. 6 and FIG. 7 show in each instance an exploded view of a transition zone between an outer diameter and the lateral edges 57a, 57b of the outer bearing ring 46, in order to elucidate the various embodiments of the chamfer dimensions 61, 62, which may also be referred to as the edge roundness. An amount of 1.5±0.5 mm is provided as the chamfer dimension 62 for the flanged edge 57b; and an amount of 1.2±0.5 mm is provided as the chamfer dimension 61 for the solid edge 57a. In conformity, the chamfer dimensions 61, 62 enclose in each case an $X_1$ or $X_2$ amount, which is surpassed by the associated $Y_1$ and $Y_2$ amounts. The amount $X_3$ defines a tolerance range, which is intended for production, for the free end of the flanged edge 57b.

FIG. 8 shows a cross section of the outer contour of the bearing ring 46 in order to elucidate a conicity. According to this figure, the outer diameter $D_2$ at the flanged edge surpasses the outer diameter $D_1$ at the solid edge. Furthermore, the following formula is provided between the outer diameters $D_1$ and $D_2$ and a diameter $D_3$ that is generated in the center: $(D_1+D_2)/2-D_3 \geq 0.5$ mm.

The record 68, shown in FIG. 9, relates to a measurement of the linearity of the axially extending raceway curvature 56 of the section 55 of the outer bearing ring 46, wherein the axial raceway curvature exhibits a transverse convexity. A maximum curvature occurs in the flattened area of the raceway curvature 56 that forms the contact zone 58. In the loose state a raceway linearity of 0.015 to 0.04 mm is provided; and in the pressed-in state a raceway linearity of 0.01 to 0.02 mm is provided.

LIST OF REFERENCE NUMBERS 41 bearing position
42 roller bearing
43 rolling element
44 ring gap
45 rolling raceway (inner)
46 bearing ring (outer)
47 bearing ring (inner)
48 rolling raceway (outer)
49 cage
50 bore
51 housing
52a section
52b section
53a area
53b area
54 axis of rotation
55 section
56 raceway curvature
57a solid edge
57b flanged edge
58 contact zone
59 punched blanks
60 polygonal bearing
61 chamfer dimension
62 chamfer dimension
65 shaft
66 slit
67 profiling
68 record of the data recorder
A non-load bearing area (hill zone)
B load bearing area (valley zone)
$D_1$ diameter
$D_2$ diameter
$D_3$ diameter
H enveloping circle
I inner circle (maximum inscribed circle)
S wall thickness
$S_1$ radial clearance
$S_{max}$ radial clearance (maximum)
$X_1$ chamfer dimension
$X_2$ chamfer dimension
$X_3$ amount of tolerance (flanged edge)
$Y_1$ chamfer dimension
$Y_2$ chamfer dimension
$a_1$ angle
$a_2$ angle

What is claimed is:

1. A bearing position for rotatably mounting a shaft or an axle in a housing, wherein the bearing position comprises:
a rolling bearing, which is designed as a roller bearing, with an outer bearing ring, which is assigned to the housing, where said outer bearing ring forms an outer rolling raceway, which faces radially inwards and on which rolling elements are guided, said rolling elements mutually interacting with an inner rolling raceway of the shaft or with an inner bearing ring, wherein:
the roller bearing of the bearing position is designed as a polygonal bearing, which encloses at least one of the inner and outer bearing rings with an elastic section which forms a raceway curvature exhibiting a transverse convexity and by means of which at least one rolling element is elastically supported in a radially prestressed manner without radial clearance on the inner rolling raceway or the outer rolling raceway and the outer bearing ring exhibits a deviation of roundness of ≥0.2 mm in the loose state and a deviation from roundness of ≥0.025 mm, measured in a ring gauge made of steel.

2. The bearing position recited in claim 1, wherein the outer bearing ring or the inner bearing ring of the polygonal bearing comprises at least one section, which is configured so as to be radially elastic and which forms a longitudinal convexity.

3. The bearing position recited in claim 1, wherein the elastic, transversely convex section of the raceway curvature is supported on the rolling element by means of a flattened contact zone.

4. The bearing position recited in claim 1, wherein the outer bearing ring comprises a solid edge and on the opposite side a flanged edge as well as on the outside a conicity, where an outer diameter at the flanged edge surpasses an outer diameter at the solid edge.

5. The bearing position recited in claim 1, wherein at least one edge, a solid edge or a flanged edge, has a profiling in the form of symmetrically distributed punched blanks on a radial inner face.

6. The bearing position recited in claim 1, wherein the bearing ring provides a chamfer dimension of 1.2±0.5 mm in a transition zone between the outer contour and a solid edge;

and a chamfer dimension of 1.5±0.5 mm is provided in a transition zone between the outer contour and a flanged edge.

7. The bearing position recited in claim 1, wherein the transversely convex raceway curvature of the bearing ring exhibits a raceway linearity of ≥0.015 mm in a loose state; and in a pressed-in state a non-load bearing area, a hill zone, shows a value of ≥0.01 mm; and a load bearing area, a valley zone, shows a value of ≥0.02 mm.

8. The bearing position recited in claim 1, wherein the bearing position is intended for a steering mount or for a mounting of a converter neck of a torque converter in a transmission.

9. A method for producing and for installing a roller bearing in a bearing position, wherein the bearing position comprises a rolling bearing, which is designed as a roller bearing, with an outer bearing ring, which is assigned to the housing, where said bearing ring forms an outer rolling raceway, which faces radially inwards and on which rolling elements are guided, said rolling elements mutually interacting with an inner rolling raceway of a shaft or with an inner bearing ring, wherein the roller bearing of the bearing position is designed as a polygonal bearing, which encloses at least one of the inner and outer bearing rings with an elastic section which forms a raceway curvature exhibiting a transverse convexity and by means of which at least one rolling element is elastically supported in a radially prestressed manner without radial clearance on the inner rolling raceway or the outer rolling raceway, said method comprising the following steps:
- producing the bearing ring by forming a sheet metal strip, where at the same time a solid edge and a profiling are integrally molded on the inner face of the solid edge or a flanged edge;
- integrally molding the flanged edges on the bearing ring;
- inserting the bearing ring into a die, in order to form a polygonal shape with a deviation from roundness or raceway curvature in section;
- heat treating the bearing ring;
- assembling a cage with a slit and the rolling elements in the bearing ring to complete the polygonal bearing; and,
- pressing the roller bearing as the bearing position into a bore of a housing.

10. A bearing position for rotatably mounting a shaft or an axle in a housing, wherein the bearing position comprises:
- a rolling bearing, which is designed as a roller bearing, with an outer bearing ring, which is assigned to the housing, where said outer bearing ring forms an outer rolling raceway, which faces radially inwards and on which rolling elements are guided, said rolling elements mutually interacting with an inner rolling raceway of the shaft or with an inner bearing ring, wherein:
- the roller bearing of the bearing position is designed as a polygonal bearing, which encloses at least one of the inner and outer bearing rings with an elastic section which forms a raceway curvature exhibiting a transverse convexity and by means of which at least one rolling element is elastically supported in a radially prestressed manner without radial clearance on the inner rolling raceway or the outer rolling raceway and the outer bearing ring comprises a solid edge and on the opposite side a flanged edge as well as on the outside a conicity, where an outer diameter at the flanged edge surpasses an outer diameter at the solid edge.

11. A bearing position for rotatably mounting a shaft or an axle in a housing, wherein the bearing position comprises:
- a rolling bearing, which is designed as a roller bearing, with an outer bearing ring, which is assigned to the housing, where said outer bearing ring forms an outer rolling raceway, which faces radially inwards and on which rolling elements are guided, said rolling elements mutually interacting with an inner rolling raceway of the shaft or with an inner bearing ring, wherein:
- the roller bearing of the bearing position is designed as a polygonal bearing, which encloses at least one of the inner and outer bearing rings with an elastic section which forms a raceway curvature exhibiting a transverse convexity and by means of which at least one rolling element is elastically supported in a radially prestressed manner without radial clearance on the inner rolling raceway or the outer rolling raceway and the transversely convex raceway curvature of the bearing ring exhibits a raceway linearity of ≥0.015 mm in a loose state; and in a pressed-in state a non-load bearing area, a hill zone, shows a value of ≥0.01 mm; and a load bearing area, a valley zone, shows a value of ≥0.02 mm.

\* \* \* \* \*